3,055,943
PRODUCTION OF METAL ORGANOBORON COMPOUNDS
Julian B. Honeycutt, Jr., Baton Rouge, La., assignor to Ethyl Corporation, New York, N.Y., a corporation of Delaware
No Drawing. Filed Dec. 29, 1958, Ser. No. 783,071
4 Claims. (Cl. 260—606.5)

The present invention is concerned with the production of organoboron compounds, in particular complex metal organoboron compounds.

Organoboron compounds are fairly well known and of considerable utility. However, such compounds which are complexed with another metal, that is metal organoboron compounds similar to sodium triethylborohydride, have been little explored. Such compounds are also of considerable utility and have advantage over the more simple organoboron compounds such as triethylborane because of their greater stability and ease of handling.

It has been reported in the literature that sodium triethylborohydride can be prepared by reacting sodium hydride with triethylborane. However, the procedure suffers certain inherent disadvantages such that the process has not been employed on a commercial scale, is hazardous and impractical. The reaction of sodium hydride with triethylborane proceeds very rapidly and violently even at room temperature. Further, it is reported in the literature that lithium hydride will not react with triethylborane as readily and under the same conditions as does sodium hydride. The reaction employing lithium hydride requires using ether as a diluent and specific temperatures are reported to be employed which are considerably higher than room temperature.

An object of this invention is to provide a novel process for the manufacture of certain metal organoboron compounds. A particular object is to provide an improved process for the preparation of certain alkali or alkaline earth organoboron hydride compounds. A specific object is to provide a more efficient and practical method for the preparation of sodium triethylborohydride. These and other objects will be apparent as the discussio proceeds.

The above and other objects of this invention are accomplished by reacting a hydride of an alkali metal, having an atomic weight greater than 22, or alkaline earth metal with an organoboron compound in the presence of an ether. It has been found that the ethers are a particularly advantageous medium in which to conduct the reaction providing a fast reaction rate, high yields along with a smooth, controllable, and safe reaction. The alkali metal hydrides, of metals having an atomic weight greater than 22, particularly sodium hydride, are preferred along with the alkylboron compounds, especially triethylborane, and the ethers of polyhydric alcohols, especially the dimethyl ether of diethylene glycol. A preferred operating temperature is between about 25 to 100° C. Thus a particularly preferred embodiment of this invention comprises the reaction of sodium hydride with triethylborane in the presence of the dimethyl ether of diethylene glycol at a temperature between about 25 to 100° C.

The process is of particular advantage in that a smooth, self-controlled reaction takes place between the metal hydride and the organoboron compound. Likewise a fast reaction rate is obtained and a high yield of the desired product results. The disadvantages of the prior art reaction, which proceeds violently and requires stringent control making the process impractical, are overcome while still achieving a higher yield of product along with high purity.

The metal hydride employed is a hydride of the alkali metals having an atomic weight greater than 22 or alkaline earth metals, that is, the metals of groups I–A of the designated atomic weight and II–A of the periodic chart of the elements. Such hydrides include for example, sodium hydride, potassium hydride, beryllium hydride, magnesium hydride, calcium hydride and strontium hydride. The hydrides are prepared by conventional techniques as for example the direct reaction of the metal, preferably in finely divided form, with hydrogen. Sodium hydride is especially preferred because of its greater availability, reactivity and economy.

The organoboron compounds employed are, in general, compounds having at least one boron to carbon linkage. They are preferably liquid or soluble in the reaction system. They can be either aliphatic, alicyclic, preferably saturated, or aromatic organoboron compounds having at least one carbon to boron linkage with the remaining valences of the boron being satisfied by similar such linkages or other functional groups which are essentially inert in the principal reaction. Typical examples of such organoboron compounds include, for example, boron compounds such as trimethylborane, triethylborane, trihexylborane, trioctylborane, tricyclopentylborane, tricyclohexylborane, trimethylcyclohexylborane, diethylboron bromide, triethylborane-trimethylamine, trioctylborane-triethylamine, trioctadecylborane, triphenylborane, tribenzylborane, diphenylboron chloride, naphthyl boron dichloride and the like. Thus, the aforementioned compounds illustrate preferred organoboron compounds wherein the organo groups are alkyl, cycloalkyl, and aryl radicals. In general, the hydrocarbon groups will contain up to about 20 carbon atoms and they can be further substituted provided such substituents are inert in the reaction. The trihydrocarbon or fully alkylated boron compounds, particularly those in which the organo radicals are straight chain alkyl hydrocarbon radicals having up to about 10 carbon atoms are especially preferred because of their greater availability and applicability to the process. Mixtures of the aforementioned organoboron compounds can likewise be employed.

As stated previously, in general any ether can be employed in the process of this invention since it has been found that all ethers produce a beneficial effect on the reaction. Some criteria of choice of the ether to be employed are that it be essentially inert to the reactants, liquid under the reaction conditions and preferably at room temperature, or soluble in the reaction mixture. Generally speaking, the ethers can be non-aromatic, aromatic, and polyethers. The non-aromatic ethers include the monoaliphatic and mixed ethers, preferably saturated ethers. Typical examples of the monoaliphatic ethers which can be used are di-n-butyl ether; di-sec-butyl ether; diisobutyl ether; di-n-amyl ether; di-n-heptyl ether; and the like ethers. Examples of the mixed ethers are n-amylmethyl ether; tert-amylethyl ether; n-butylisopropyl ether; ethylisoamyl ether; n-butyl-n-propyl ether; and the like. The aromatic ethers include, for example, the monoaromatic ethers, alkyl aryl ethers, and the alkaryl alkyl ethers. Typical examples of the monoaromatic ethers include dibenzyl ether; diphenyl ether; and the like. When the aromatic ether is an alkyl aryl ether, one can employ, for example, methylphenyl ether; methyl-o, m, or p-tolyl ether; methyl-α-naphthyl ether; ethylphenyl ether; ethyl-o, m, or p-tolyl ether; ethyl-α-naphthyl ether; phenyl-n-propyl ether; isopropylphenyl ether; n-butylphenyl ether; n-butyl-o-tolyl ether; isoamyl-n-naphthyl ether; and the like. The alkaryl alkyl ethers can be, for example, benzylmethyl ether; benzylethyl ether; benzyl-n-butyl ether; and the like. Examples of the polyethers which are employed are those having the configuration R—O—(CH$_2$)$_n$—O—R wherein R is an organic radical, preferably saturated hydrocarbon or ether radicals, and $n$ is a small whole number as between about 1 to 10, preferably 1 to 3 inclusive. For example such polyethers include ethylene glycol ethyl methyl ether; the diethyl ether of ethylene glycol; methyl-n-propyl ether of ethylene glycol; 1,4-dioxane; tetraethylene glycol dimethyl ether; glycerol trimethyl ether; dimethyl ether of diethylene glycol; dimethoxyethane, diethyl ether of diethylene glycol; and the like. Other polyethers which can be employed include, for example, pyrocatechol dimethyl ether; resorcinol dimethyl ether; 1,2,4-trimethoxybenzene, and the like.

The foregoing are merely typical examples of the numerous ethers which can be employed in the process of this invention. Because of greater availability and easier handling, the liquid ethers are preferably employed, especially those having up to about 18 carbon atoms. In this connection, the polyethers are especially preferred since higher yields are obtained when such are used. Of such polyethers, the dimethyl ether of diethylene glycol and dimethoxyethane are particularly preferred. It is to be understood that the ethers need not be pure but can be mixtures of the various ethers discussed previously, for example, a mixture of the diethyl ether and the dimethyl ether of diethylene glycol. Likewise, it has been found that economies can be effected while still obtaining the benefits of the ethers by their employment in admixture with other solvents or suspending media, for example, the hydrocarbons which are particularly preferred. Typical examples of such hydrocarbons are the liquid hydrocarbons as the nonanes, octadecanes, hexanes, toluene, benzene, xylene, and mixed hydrocarbons such as gasoline, diesel oil and the like petroleum fractions.

The proportions of the reactants and ether employed are not necessarily critical but will effect the yield obtained. For example, some metal organoboron compound is obtained when only a minor amount of the alkali or alkaline earth metal is reacted with the organoboron compound or vice versa. In general, however, between about 0.8–1.5 parts of the alkali or alkaline earth metal hydride per part of the organoboron compound is employed. In a preferred operation the organoboron compound is used in slight excess. It has been found that greater yields are obtained when employing an excess of between about 10 to 50 percent by weight of the organoboron compound over the metal hydride. The solvent is employed generally in amount sufficient to slurry the metal hydride when it is a solid under reaction conditions or to provide a fluid reaction system. For convenience then, the solvent is based upon the metal hydride employed and is usually between about 10 parts to 100 parts per part by weight of the metal hydride. Improved results are obtained when the solvent is between about 10 parts to 75 parts per part by weight of the metal hydride, and such amounts are therefore preferred.

The process will be further understood from the examples which follow. Unless otherwise specified all parts are by weight.

*Example I*

To a reactor equipped with external heating and cooling means, internal agitation, means for admitting and discharging reactants and product, and a reflux condenser was added a mixture of 4.8 parts of sodium hydride and 10.5 parts of anhydrous diethyl ether under nitrogen. Then a solution of triethylborane, 35 parts (0.35 mole), in 35 parts of diethyl ether was added at a rate to maintain a gentle reflux of the ether (35° C.). Reaction was essentially instantaneous but smooth resulting in a reddish-brown oily solution. At the completion of addition of the triethylborane solution, the reaction mixture was heated without reflux to evaporate the ether from the mixture. Then the excess triethylborane was removed by heating to 75° C. at 1 millimeter of mercury pressure. The residual product, a dark viscous oil, analyzed 18 percent sodium with a sodium to hydrogen ratio of 0.99 which corresponds to sodium triethylborohydride which requires 18.85 percent sodium and a sodium to hydrogen ratio of 1.00.

*Example II*

Employing the procedure of Example I with the exception that the reaction mixture was maintained at room temperature rather than reflux temperature 7.8 parts of triethylborane in 12 parts of the dimethyl ether of diethylene glycol were similarly reacted with 1.2 parts of sodium hydride in 12 parts of dimethyl ether of diethylene glycol. An essentially quantitative yield of sodium triethylborohydride dissolved in the dimethyl ether of diethylene glycol was obtained.

*Example III*

In this run 2.4 parts of sodium hydride suspended in 25 parts of tetrahydrofuran are reacted with 12.5 parts of triethylborane at 65–70° C. for ½ hour. Sodium triethylborohydride is obtained in high yield and purity.

*Example IV*

To the reactor of Example I is added 12.1 parts of triphenylborane dissolved in 250 parts of dioxane. Then a slurry of 1.0 part of sodium hydride in 20 parts of dioxane is slowly added to the reactor and the temperature maintained at 80° C. for 1 hour. Sodium triphenylborohydride is obtained in high yield.

*Example V*

The procedure of Example IV is followed with exception that tricyclohexylboron and the dimethyl ether of ethylene glycol are employed in place of the boron compound and solvent respectively and the temperature is maintained at 90–100° C. for 3 hours. Sodium tricyclohexylborohydride is obtained in high yield.

*Example VI*

Example I is repeated with exception that potassium hydride is reacted with trimethylborane in 100 parts of diamyl ether at 25° C. for 2 hours. Potassium trimethyl borohydride is produced.

*Example VII*

Calcium bis-(trioctylborohydride) is obtained in high yield when 4.2 parts of finely divided calcium hydride are reacted with 84.0 parts of trioctylborane in 500 parts of diphenyl ether at 180° C. for 30 minutes.

*Example VIII*

When reacting 2.6 parts of finely divided magnesium hydride with 22.0 parts of triethylboron in 50 parts of diethyl ether at the reflux temperature for 4 hours, magnesium bis-(triethylborohydride) is obtained.

*Example IX*

Example I is repeated with exception that diethylboron chloride is employed in place of triethylboron. Sodium diethylchloroborohydride is produced.

The above examples are presented by way of illustration and it is not intended to be limited thereby. It will be evident that other organoboron compounds, metal hydrides and ethers mentioned hereinbefore can be substituted to produce equally satisfactory results.

The reaction between the metal hydride and the organoboron compound is self-sustaining and will readily initiate upon mere admixture of the materials. In general, temperatures between about 25 to 200° C. are preferably employed for fastest reaction rates while still avoiding undesirable side reactions. In order to obtain best results reaction temperatures between 25 to 100° C. are employed. Although the above examples have demonstrated the preferable use of atmospheric pressure, it is to be understood that pressures below and above atmospheric can be employed. Likewise at temperatures above about 150° C., pressure can be used to advantage in those instances where the product is susceptible to degradation. In general, pressures between about atmospheric to 500 p.s.i. are employed when so required.

As demonstrated by the examples the reaction is essentially instantaneous in most instances. Ordinarily reaction times less than a period of about 5 hours are employed but generally times between about ¼ to 2 hours are preferred. Longer reaction times at temperatures above 100° C. are to be avoided since some degradation of the product may occur.

It is not necessary to isolate the metal organoboron hydride from the reaction mixture since it is employable as obtained. If it is desirable to isolate the product such can be done readily by evaporation of the ether and excess organoboron reactant when employed. Likewise, the product can be purified to only contain the metal organoboron hydride in solution in the ether by vacuum distilling any excess organoboron reactant. A solution of the product in the ether is a very effective form for its employment. Since the product is highly reactive it should be kept in an inert atmosphere or blanketed by inert liquids.

The products of this invention are of considerable utility. For example, they can be used as a source of hydrogen by reaction with an alcohol or water. Thus the generation of hydrogen is readily attained by slowly adding water to sodium triethylborohydride. The products are also suitable for use as selective reducing agents. A still further use of the products is their olefination to obtain additional carbon to boron linkages in the product. For example, sodium triethylborohydride can be reacted with ethylene to produce sodium tetraethylboron. Likewise mixed alkyl products can be obtained by reacting, for example, sodium triethylborohydride with 1-hexene to obtain sodium triethylhexylboron. Such products are useful as alkylating agents. For example, they can be reacted with lead salts to produce the corresponding organolead compounds. Other uses for the products produced according to the process will be evident.

Having thus described the process of this invention, it is not intended that it be limited except as set forth in the following claims.

I claim:

1. The process for producing a metal hydrocarbon boron hydride which comprises reacting a hydride of a metal selected from the group consisting of alkali metals having an atomic weight above 22 and alkaline earth metals with a trihydrocarbon boron compound wherein the hydrocarbon groups are selected from the group consisting of alkyl, cycloalkyl, and aryl radicals in the presence of an ether selected from the group consisting of liquid saturated ethers and liquid aromatic ethers.

2. The process for producing sodium triethylboro-hydride which comprises reacting sodium hydride with triethylborane in the presence of the dimethyl ether of diethylene glycol at between about 25 to 200° C.

3. The process for producing a metal trialkyl boron hydride which comprises reacting a hydride of a metal selected from the group consisting of alkali metals having an atomic weight above 22 and alkaline earth metals with a trialkyl boron compound in the presence of an ether selected from the group consisting of liquid saturated ethers and liquid aromatic ethers.

4. The process of claim 3 wherein the reaction is conducted in the presence of the dimethyl ether of diethylene glycol at between about 25 to 100° C. and an excess of between about 10 to 50 percent by weight of the trialkylboron compound over the theoretical is employed.

References Cited in the file of this patent

UNITED STATES PATENTS 2,917,547 Williams _____ Dec. 15, 1959

OTHER REFERENCES

Brown et al.: J. Am. Chem. Soc., vol. 75, pages 192–195 (1953). (Copy in Sci. Lib.)